United States Patent [19]
Hirota et al.

[11] Patent Number: 6,152,178
[45] Date of Patent: Nov. 28, 2000

[54] FOUR-WAY DIRECTIONAL CONTROL VALVE

[75] Inventors: Hisatoshi Hirota; Katsumi Koyama, both of Tokyo, Japan

[73] Assignee: TGK Co. Ltd., Tokyo, Japan

[21] Appl. No.: 09/467,323

[22] Filed: Dec. 20, 1999

[30] Foreign Application Priority Data

Jun. 17, 1999 [JP] Japan ................... 11-170391

[51] Int. Cl.$^7$ ................................ F16K 11/044
[52] U.S. Cl. .................... 137/625.43; 251/30.01
[58] Field of Search .............. 137/625.43; 251/30.01

[56] References Cited

U.S. PATENT DOCUMENTS

| | | | |
|---|---|---|---|
| 4,492,252 | 1/1985 | Kanai | 137/625.43 |
| 5,152,265 | 10/1992 | Hummel et al. | 123/198 DB |

Primary Examiner—John Fox
Attorney, Agent, or Firm—Nilles & Nilles SC

[57] ABSTRACT

In a four-way directional control valve of simplified construction and reduced manufacturing costs, first and second hollow cylindrical valve elements are arranged coaxially. Adjacent to opposite ends of the valve elements, first and second valve seats and first and second valve closure elements are provided. First and second pressure-regulating chambers are arranged between separator walls of the valve elements and first and second partition walls associated to the first and second valve seats. A pilot valve can be switched between switching positions for introducing high-pressure fluid originating from a first pipe into the first or second pressure-regulating chamber via a common high-pressure passage, a high pressure introducing hole and two pilot holes, respectively, associated to the pressure-regulating chambers. The control valve can be switched into a state where the first pipe communicates with the fourth and the second pipe communicates with the third pipe and to another state where the first pipe communicates with the third pipe and the second pipe communicates with the fourth pipe.

11 Claims, 14 Drawing Sheets

FOUR-WAY DIRECTIONAL CONTROL VALVE

BACKGROUND OF THE INVENTION

1. Field of the Invention

The present invention relates to a four-way directional control valve, and particularly to a four-way directional control valve designed to switch between several refrigerant lines, e.g. in a heat pump type air conditioning system for an automotive vehicle, e.g., to switch between a state where a pipe A communicates with a pipe D while a pipe B communicates with a pipe C and another state where said pipe A communicates with pipe C while pipe B communicates with pipe D.

2. Description of the Related Art

According to U.S. Pat. No. 4,805,666 a four-way directional control valve of a refrigerating cycle includes a flat valve seat formed with several openings communicating with respective pipes and a hemispherical valve slider slidably arranged on said valve seat. Sliding of said valve slider switches between the different states of communications between the pipes. Said valve slider and said valve seat need to be formed of solid material and need to have excellent sliding performance and a very high precision flatness at a mirror surface level in order to prevent leakage. Said components are costly to manufacture. A rubber sealing or the like cannot be used, because that material suffers from abrasion when said components are slid on each other.

Earlier European patent application EP-A-0927846, published after the priority date of the present application, proposes a four-way directional control valve capable of performing positive four-way directional control or four pipes without needing very high precision sealing components but with a combination of components at a normal precision level. Between two axially aligned oppositely facing valve seats first and second hollow and coaxial cylindrical valve elements are arranged in an axially moveable manner. First and second coaxial and flat valve closure elements are associated to and urged against said valve seats from their axial outer sides. Each valve seat defines together with an associated to partition wall a connecting portion communicating with one of said pipes, while within said casing a first pipe is communicating with a common high pressure passage extending to both valve seats. Both cylindrical valve elements penetrate said partition walls and alternatingly co-operate with said first and second valve closure elements in order to let them be seated on the respective valve seat or to lift them. Stationary further partition walls confine an isolated low pressure chamber communicating with a second pipe. Both cylindrical hollow valve elements are open towards said isolated low pressure chamber. Each cylindrical hollow valve element carries a separator wall defining a ring piston located within a respective first and second pressure regulating chamber. The pressures in said first and second pressure regulating chambers are varied by a solenoid actuated pilot valve adapted to alternatingly vent one of first and second pressure regulating chambers into said isolated low pressure chamber, while both first and second pressure regulating chambers permanently are connected to said common high pressure passage via orifices. Said proposed control valve design has a plurality of axially arranged spaces, namely nine spaces among which some are constantly are under high pressure while others are under medium or even under low pressure. The design needs a plurality of components and particularly a large number of sliding sealing portions for the cylindrical hollow valve elements. There are six sealing portions where during a relative axial motion has to be sealed, and eighth stationary sealing portions, each containing at least one resilient sealing element, resulting in an increase in manufacturing efforts and costs.

OBJECTS AND SUMMARY OF THE INVENTION

It is an object of the present invention to provide a four-way directional control valve which is simplified in construction and can be manufactured at lower costs.

Said object can be achieved with the feature combinations contained in independent claims 1, 3, 5 and 7.

When in the four-way directional control valve of claim 1 the pilot valve opens the communication between the common high pressure passage and the first pressure regulating chamber, the first hollow cylindrical valve element axially displaces the second hollow cylindrical valve element until the second hollow cylindrical valve element opens the second valve closure element while the first valve closure element is kept closed by its spring force. Then the first pipe communicates with the fourth pipe via the second valve seat, while the second pipe communicates with the third pipe via the hollow interior space of the first hollow cylindrical valve element. In its other switching position the pilot valve communicates the common high pressure passage and the second pressure-regulating chamber. The high pressure causes the second hollow cylindrical valve to axially displace the first hollow cylindrical valve which then opens the first valve closure element while the second valve closure element is kept closed by its urging spring force.

Consequently, the first high pressure pipe communicates with the third pipe via the open first valve seat, while the second pipe communicates with the fourth pipe via the hollow space of the second hollow cylindrical valve element.

In other words, the four-way directional control valve according to the present invention only has seven pressure containing spaces in total defined therein, i.e. two spaces at the axially opposite end portions of the casing being constantly at high pressure and in communication with the first pipe, one space or the isolated low pressure chamber defined in the central portion of the casing constantly at low pressure and in communication with the second pipe, two spaces or said connecting portion defined at respective locations between the spaces constantly at high pressure and the low pressure isolated chamber, said connecting portions constantly communicating with the third and fourth pipes, respectively, and two pressure regulating chambers either defined on opposite sides of said low pressure isolated chamber or only at one side of said isolated low pressure chamber. Therefore, component parts and elements like sealing members for separating the respective spaces can be decreased in number which contributes to a reduction of manufacturing costs of the four-way directional control valve.

According to claim 5 the separator walls of both hollow cylindrical valve elements basically serving to drive said valve elements back and forth additionally serve to confine said central low pressure isolated chamber. By said measure at least two sealing portions where axial sliding motions occur and two stationary sealing portions are saved. Since, furthermore, both partition walls necessary to confine said connecting portions of the third and fourth pipes, additionally serve to define said first and second pressure regulating chambers, also here sliding sealing portions and stationary sealing portions can be saved.

According to claim 7 only a single cylindrical hollow valve element is provided carrying a single separator wall for driving said cylindrical hollow valve element back and forth. Said single separator wall also structurally separates said first and second pressure regulating chambers. Said first and second pressure regulating chambers are confined by one of the partition walls of the connecting portion of one of the fourth or third pipe and an additional partition wall stationary provided within said casing bore. Finally, said isolated low pressure chamber is confined by the other of the partition walls of the other connecting portion and said additional partition wall. By said measure only a minimum of sealing portions for sliding motions and stationary sealing portions can be achieved, totally resulting in reduced manufacturing costs and a reduction of potential leakage spots. In any case, furthermore, the sliding resistance of the cylindrical hollow valve elements or the single cylindrical hollow valve element is significantly reduced due to the reduced number of sliding sealing portions.

Further, advantageous embodiments are contained in the depending claims.

BRIEF DESCRIPTION OF THE DRAWINGS

FIG. 7 is a longitudinal section showing a transitional state of valve switching immediately after the solenoid is switched on;

FIG. 12 is a longitudinal section of the same valve showing a transitional state of valve switching immediately after the solenoid is switched on;

DESCRIPTION OF THE PREFERRED EMBODIMENTS

Figure 1:
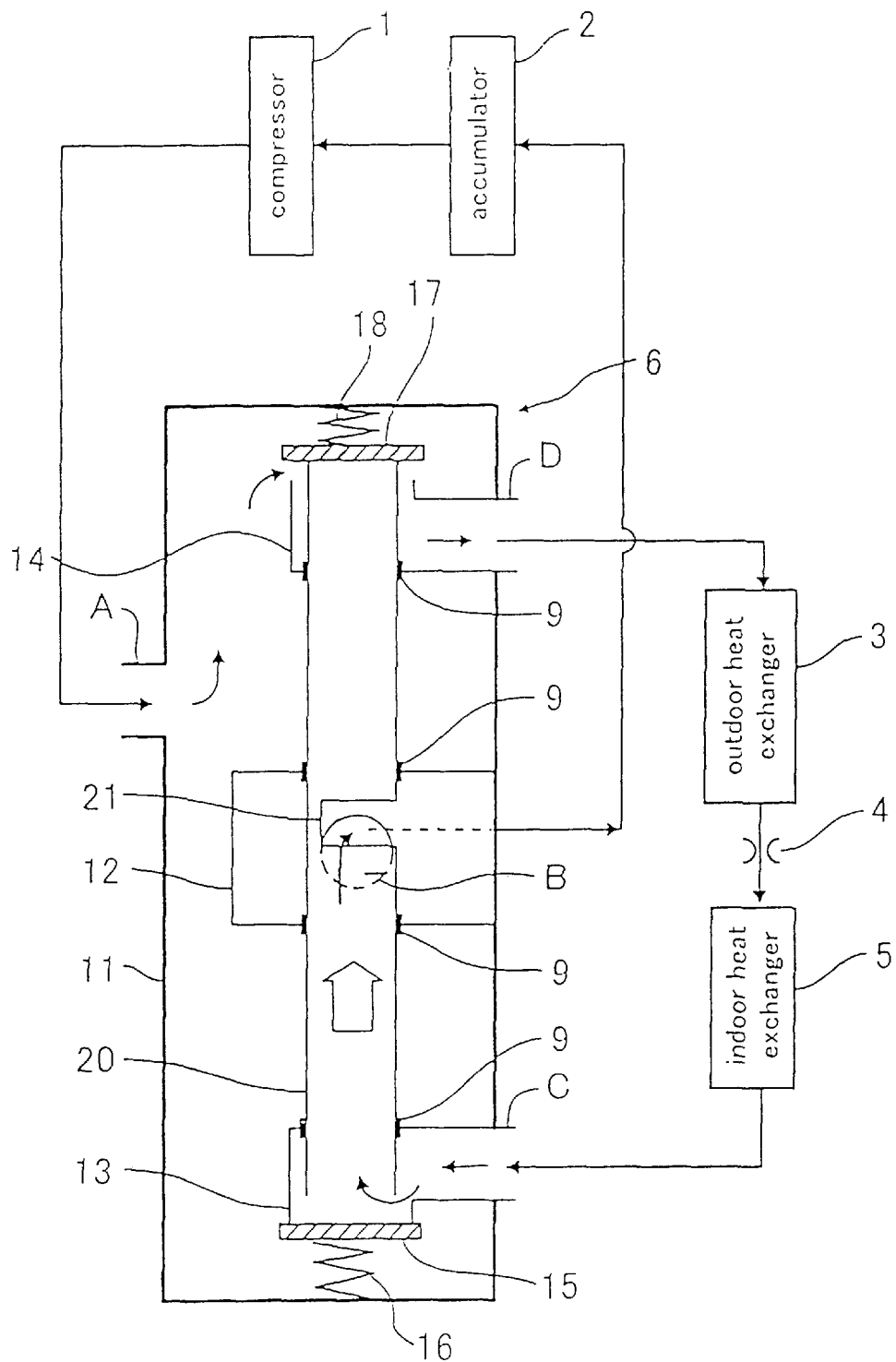
FIG. 1 is a schematic diametrical view of a four-way directional control valve integrated into a refrigerating cycle, in one operational state.

FIG. 1 outlines a cooling operational state of an air conditioning system, e.g. a heat pump type air conditioning system for a automotive vehicle. The air conditioning system comprises a compressor 1, an accumulator 2, an outdoor heat exchanger 3, an expansion device 4, an indoor heat exchanger 5, and a four-way directional control valve 6 having ports for first to fourth pipes A, B, C, D. Pipe A is connected to an output side of compressor 1. Pipe B is connected to an input side of accumulator 2. Pipe C is connected to an output side of indoor heat exchanger 5, and pipe D is connected to an input side of outdoor heat exchanger 3.

Control valve 6 has a valve casing 11 communicating in its interior space, as a totally hermetically sealed enclosure, with first pipe A. An isolated chamber 12 is separated from the interior space and communicates with second pipe B. A first valve seat 13 in the form of a hollow cylinder is formed at a location of casing 11 towards one end thereof. Said hollow cylinder has opposite open ends. The third pipe C is connected to first valve seat 13. At a location towards the other end of casing 11 a second valve seat 14 is formed as a hollow cylinder with forth pipe D being connected to second valve seat 14 for communication therewith. Opposite to first valve seat 13 a first a valve closure element 15 is arranged urged by a compression coil spring 16 in a valve closing direction against first valve seat 13. A second valve closure element 17 is arranged opposite to the second valve seat 14 and is urged by compression coil spring 18 in a valve closing direction against second valve seat 14. A slender hollow cylindrical valve element 20 is axially moveable within valve casing 11. Valve element 20 has an intermediate portion extending through said isolated chamber 12 and opposite outer end portions inserted into pipe-shaped connecting portions of said first and second valve seats 14, 13 communicating with said third and fourth pipes C, D, respectively. The axial length of valve element 20 is approximately equal to the axial distance between first and second valve seats 13, 14. In an intermediate portion of valve element 20 within isolated chamber 12, a cut-out hole 21 is formed. Annular sealing members 9 such as elastic O-rings are surrounding valve element 20 for preventing undesired leakage of refrigerant gas between the interior space of the valve casing 11 and pipes B, C, D.

In the state of FIG. 1 valve element 20 presses second valve closure element 17 and overcomes the force of compression coil spring 18 such that second valve closure element 17 is lifted from second valve seat 14. First valve closure element 15 maintains its intimate contact with first valve seat 13. High-pressure refrigerant gas compressed by compressor 1 and introduced into control valve 6 through first pipe A, passes through second valve seat 14 into fourth pipe D, further through heat exchanger 3 before it passes in condensed form through expansion device 4 for separation into low-pressure low-temperature gas and liquid. The liquid refrigerant undergoes heat exchange with the indoor heat exchanger 5 whereby it is vaporised. The resulting gaseous refrigerant enters the control valve 6 through third pipe C. Said gaseous refrigerant reaches second pipe B via the interior space of valve element 20 and enters the accumulator 2 where it undergoes gas/liquid separation prior to entering the compressor 1. Air having undergone heat exchange or being cooled by the indoor heat exchanger 5 is introduced into the compartment of the vehicle.

Figure 2:
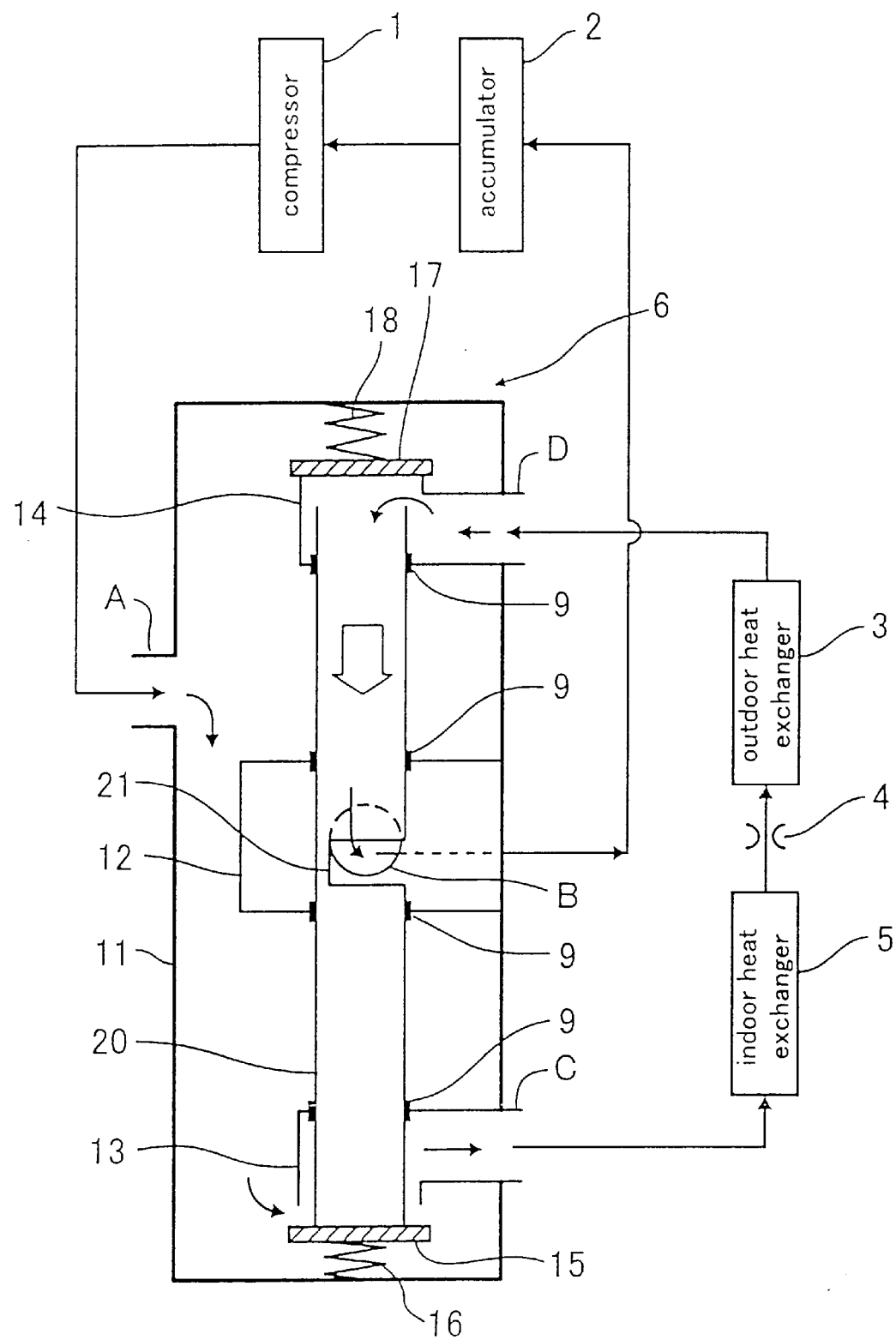
FIG. 2 is a similar schematic view of the valve in another operational state of a heat pump type air conditioning system for an automotive type vehicle.

In FIG. 2 control valve 6 has switched for heating of the air conditioning system. Valve element 20 lifts first valve closure element 15 from valve seat 13, while second valve closure element 17 maintains its intimate contact with the second valve seat 14. High-temperature pressure refrigerant gas compressed by compressor 1 enters control valve 6 through first pipe A and reaches third pipe C via first valve seat 13. Said refrigerant gas is contained in indoor heat exchanger 5 and passes then through expansion device 4 where it is separated into low-pressure low-temperature gas and liquid. The liquid refrigerant undergoes heat exchange within indoor heat exchanger 5 and is vaporised. The resulting gaseous refrigerant is introduced into control valve 6 via fourth pipe D and further through the interior space of cylindrical valve element 20, and through cut-out 21 into second pipe B and further into the accumulator for gas/liquid separation prior to being introduced into compressor 1. Air having undergone heat exchange or been heated by indoor heat exchanger 5 is introduced into the compartment of the vehicle.

Figure 3:
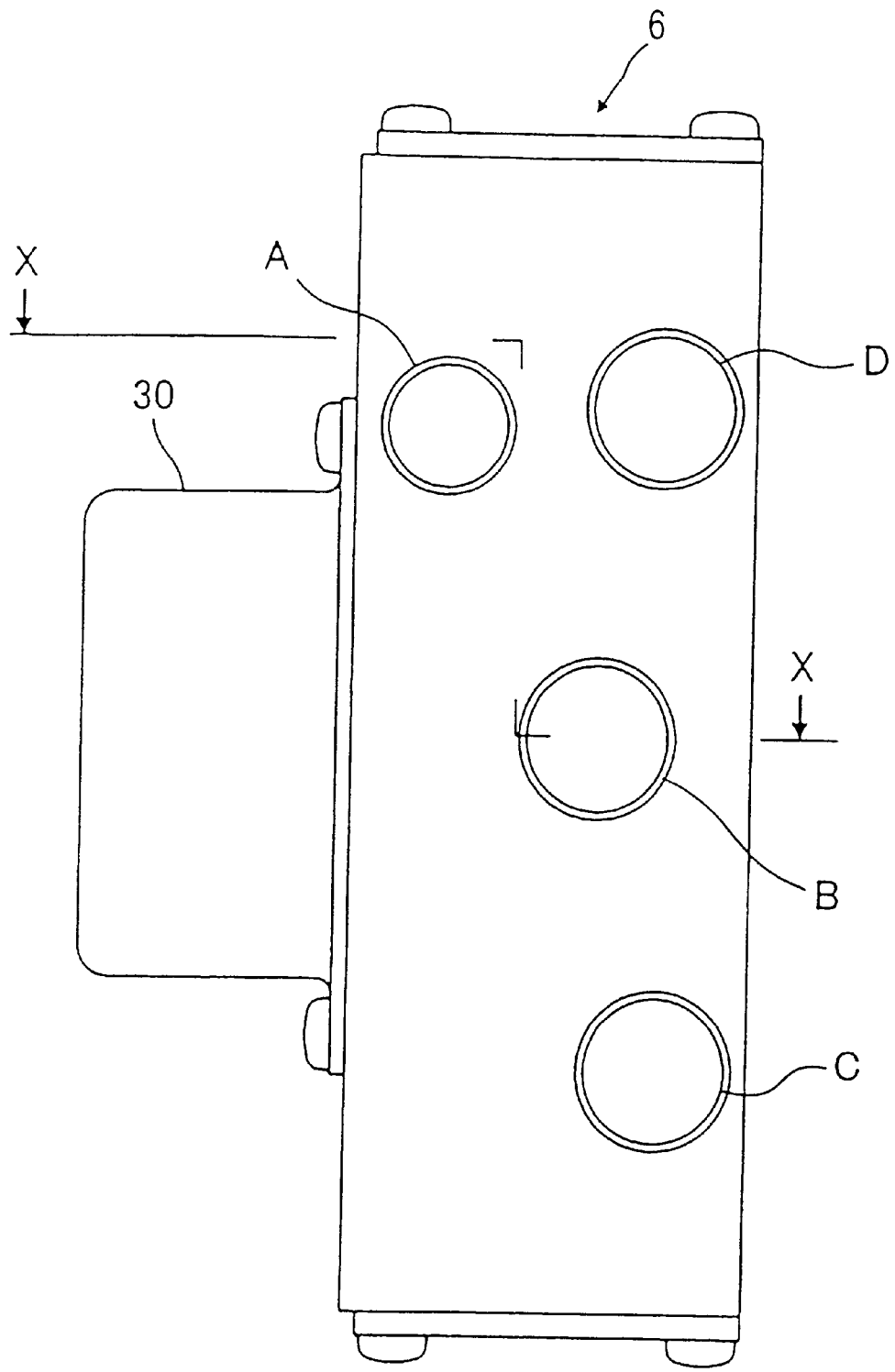
FIG. 3 is a front view of a directional control valve as shown in detail in FIGS. 4 to 9.
Figure 4:
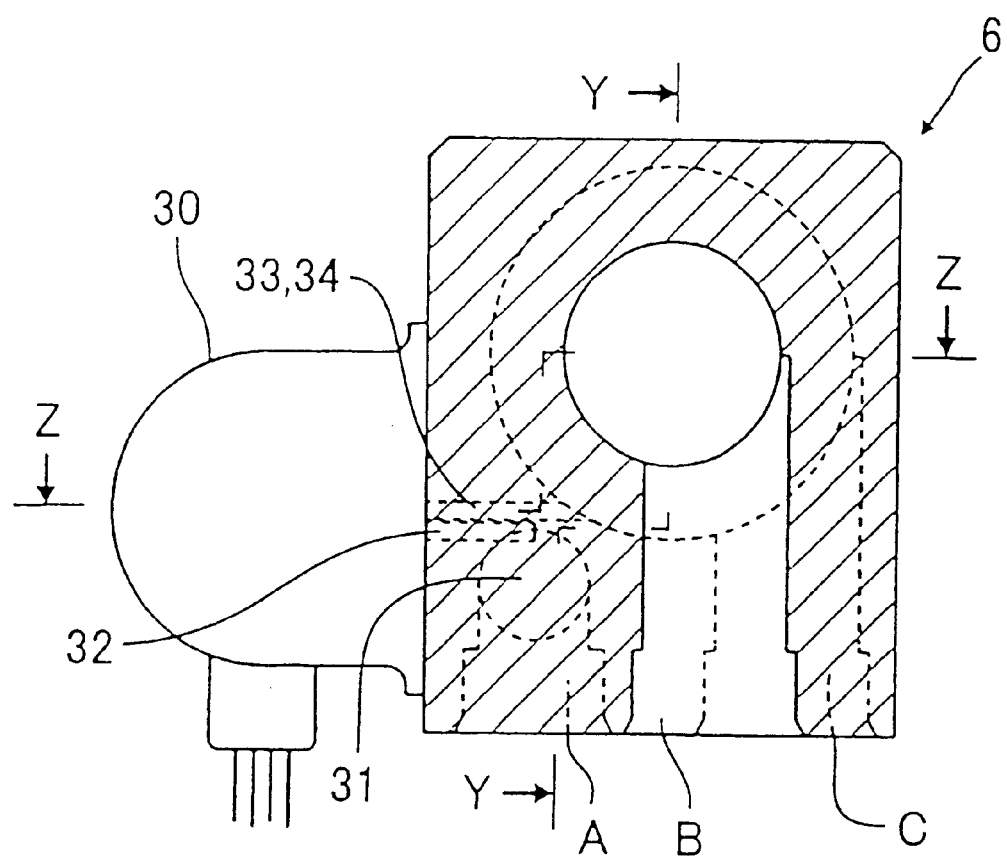
FIG. 4 is a sectional view in plane X—X of FIG. 3.

In FIGS. 3 and 4 pipes A, B, C and D are arranged in a front wall of the casing 11 and a solenoid-driven pilot valve 30 is mounted on a side wall of said control valve 6. In the sectional plane X—X of FIG. 3 FIG. 4 shows a high pressure introducing hole 32 branching from a common high pressure passage 31 communicating with first pipe A, and two pilot holes 34, 33 extending respectively into two here not shown pressure regulating chambers connected to pilot valve 30. Control valve 6 is switched by introducing high-pressure refrigerant gas via introducing hole 32 and changing the flow direction by on/off control of a solenoid to thereby guide the refrigerant gas into a selected one of the pressure-regulating chambers via a corresponding one of the pilot holes 33, 34 in order to thereby axially move hollow cylindrical valve element 20.

Figure 5:
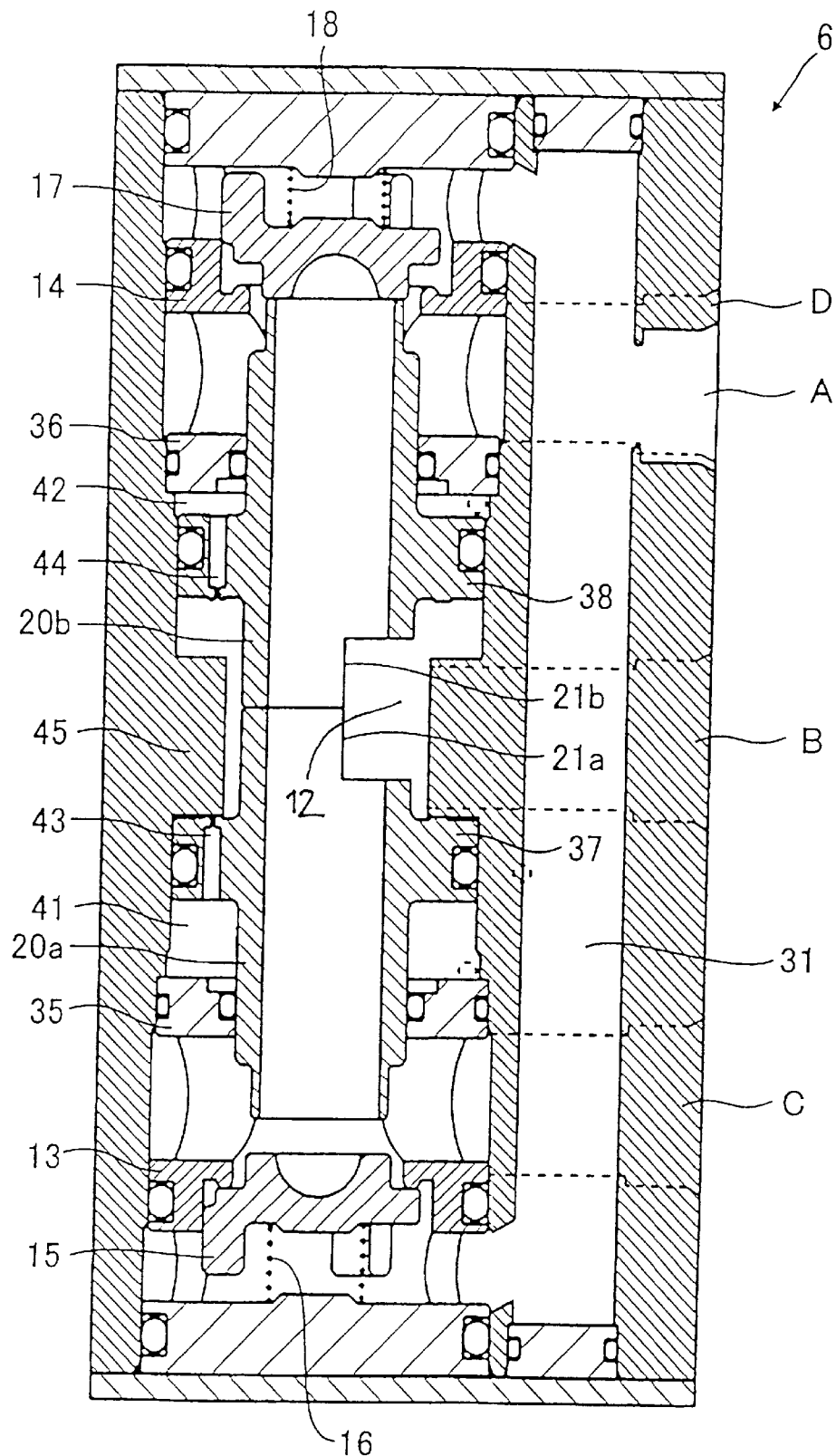
FIG. 5 is a longitudinal section in section plane Y—Y of FIG. 4 in an "off" state of a solenoid.
Figure 6:
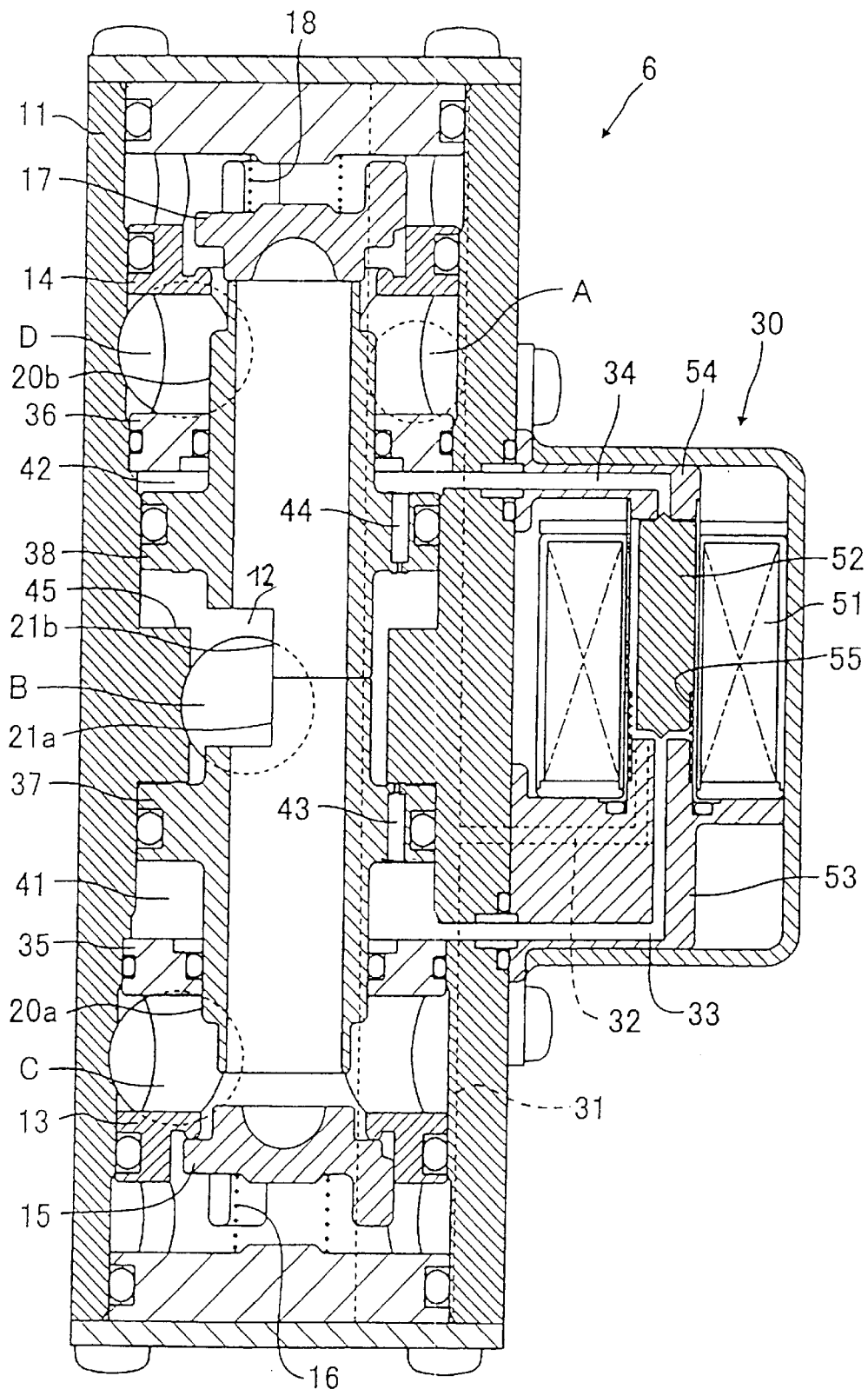
FIG. 6 is a longitudinal section in plane Z—Z of FIG. 4 in the "off" state of the solenoid.

FIG. 5 shows an "off" state of the solenoid of control valve 6 shown in section plane Y—Y, while FIG. 6 shows the same "off" state of the solenoid in a section in plane Z—Z of FIG. 4.

In the valve casing 11 a space or longitudinal inner casing bore for receiving a valve mechanism is formed. High pressure passage 31 extends outside said casing bore. Both ends of said valve casing 11 are hermetically closed by lids. The valve mechanism comprises a first compression coil spring 16, a first valve element 15, a first valve seat 13, a first partition wall 35, first and second hollow cylindrical valve elements 20a, 20b, a second partition wall 36, a second valve seat 14, a second valve element 17, and a second compression coil spring 18.

A space or connection portion defined between first valve seat 13 and first partition wall 35 communicates with third pipe C, while a space or connection portion defined between second valve seat 14 and second partition wall 36 communicates with fourth pipe D.

First and second hollow cylindrical valve elements 20a, 20b have cut-out holes 21a, 21b formed in portions adjacent respective axial inner end faces thereof abutting each other, said cut-out holes communicating with isolated chamber 12 to second pipe B. Each of said first and second valve elements 20a, 20b has an exterior annular flange portion defining separator walls 37, 38, respectively. Between said flange portions or separator walls 38, 37 and the first and second partition walls 35, 36, respectively, first and second pressure-regulating chambers 41, 42 are defined. Said separator walls 37, 28 of valve elements 20a, 20b form portions of the walls of the isolated low pressure chamber 12 shown in FIGS. 1 and 2 communicating with second pipe B. Each separator wall 37, 38 is formed with an orifice 43, 44, respectively, for communication between the first and second pressure-regulating chambers 41, 42 and the isolated chamber 12. Within said casing bore a reduced diameter stepped-up portion 45 is formed at an axially central portion thereof. Said step-up portion 45 has axially opposite end faces for abutment of a corresponding one of said separator walls 37, 38 with the mouth of the respective orifice 43, 44 in order to temporarily close said orifice 43 or 44.

In FIG. 6 pilot valve 30 comprises an electromagnetic coil 51, a moveable core 52 serving as a valve element, a fixed core 53 containing a high-pressure introducing hole 32 and a pilot hole 33, a valve seat 54 formed at the mouth of a pilot hole 34, and a compression coil spring 55 for constantly urging moveable core 52 away from fixed core 53. High pressure-introducing hole 32 communicates with the common high pressure passage 31. Pilot hole 33 communicates with first pressure-regulating chamber 41. Pilot hole 34 communicates with second pressure-regulating chamber 42.

In the "off" state of the solenoid (coil 51 not energised) moveable core 52 is held by compression spring 55 to close pilot hole 34 and to maintain pilot hole 33 open. High-pressure refrigerant gas entering from common high pressure passage 31 flows through high-pressure introducing hole 32 into a cylindrical chamber containing moveable core 52 with radial clearance so that said gas reaches first pressure-regulating chamber 41 via pilot hole 33. At the same time second pressure-regulating chamber 42 communicates via orifice 44 with isolated low-pressure chamber 12 communicating with second pipe B. Pressure within second pressure-regulating chamber 42 is approximately equal to said low pressure within isolated low pressure chamber 12. A differential pressure between both pressure-regulating chambers 41 and 42 causes first and second valve elements 20a, 20b to press on second valve closure element 17, to overcome the force of compression coil spring 18, and to lift second valve closure element 17 off second valve seat 14. At the same time first valve closure element 15 is held closed by first compression coil spring 16. The flange portion or separator wall 37 of valve element 20a abuts against stepped-up portion 45 so that orifice 43 is closed at its mouth to minimise the amount of refrigerant gas leaking through orifice 43.

Refrigerant gas from first pipe A flows through second valve seat 14 into pipe D while refrigerant gas from pipe C passes through the interior of cylindrical valve element 20a and the cutout holes 21a, 21b into isolated low-pressure chamber 12 and further into second pipe B.

Figure 7:
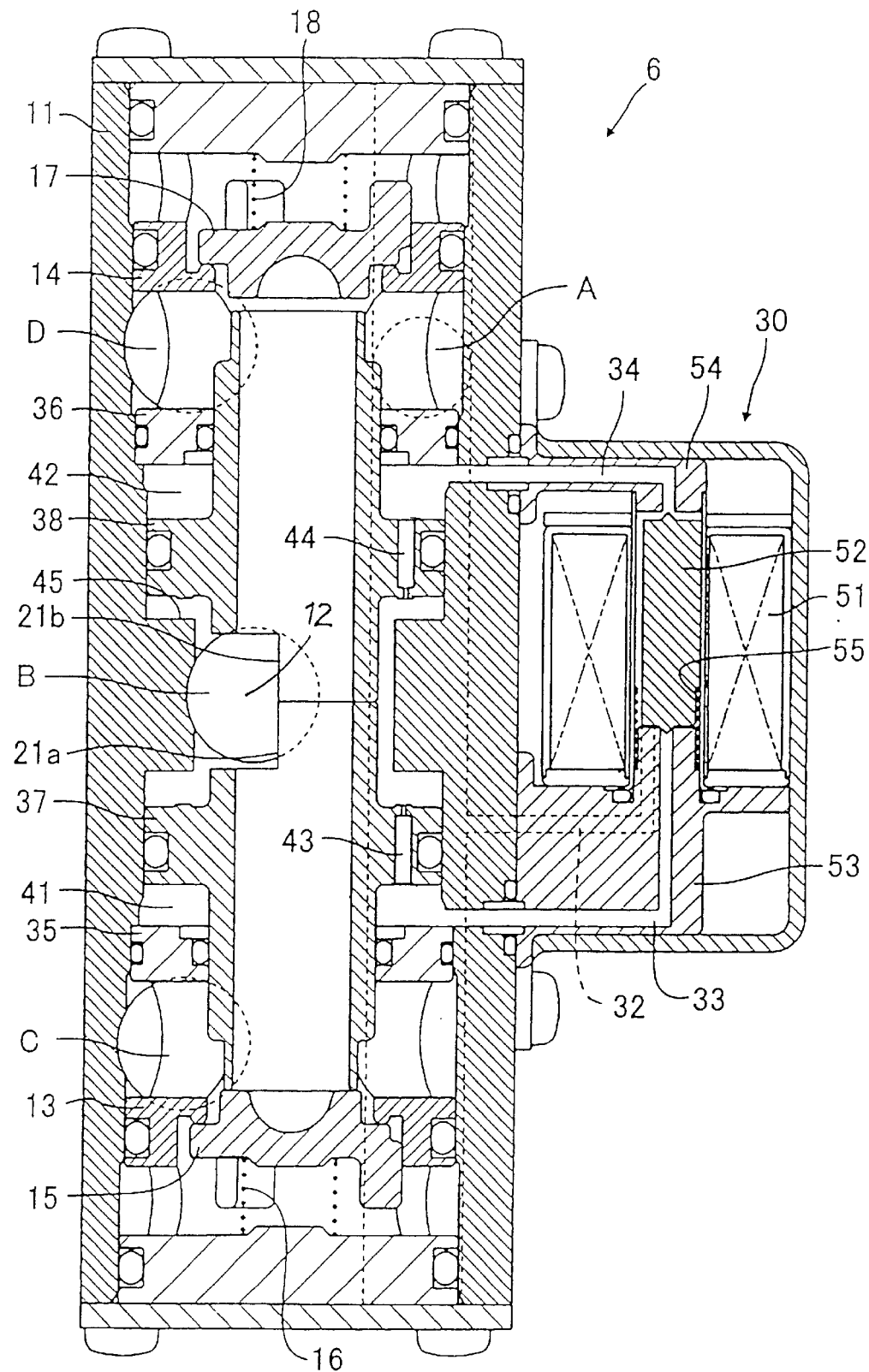
Figure 8:
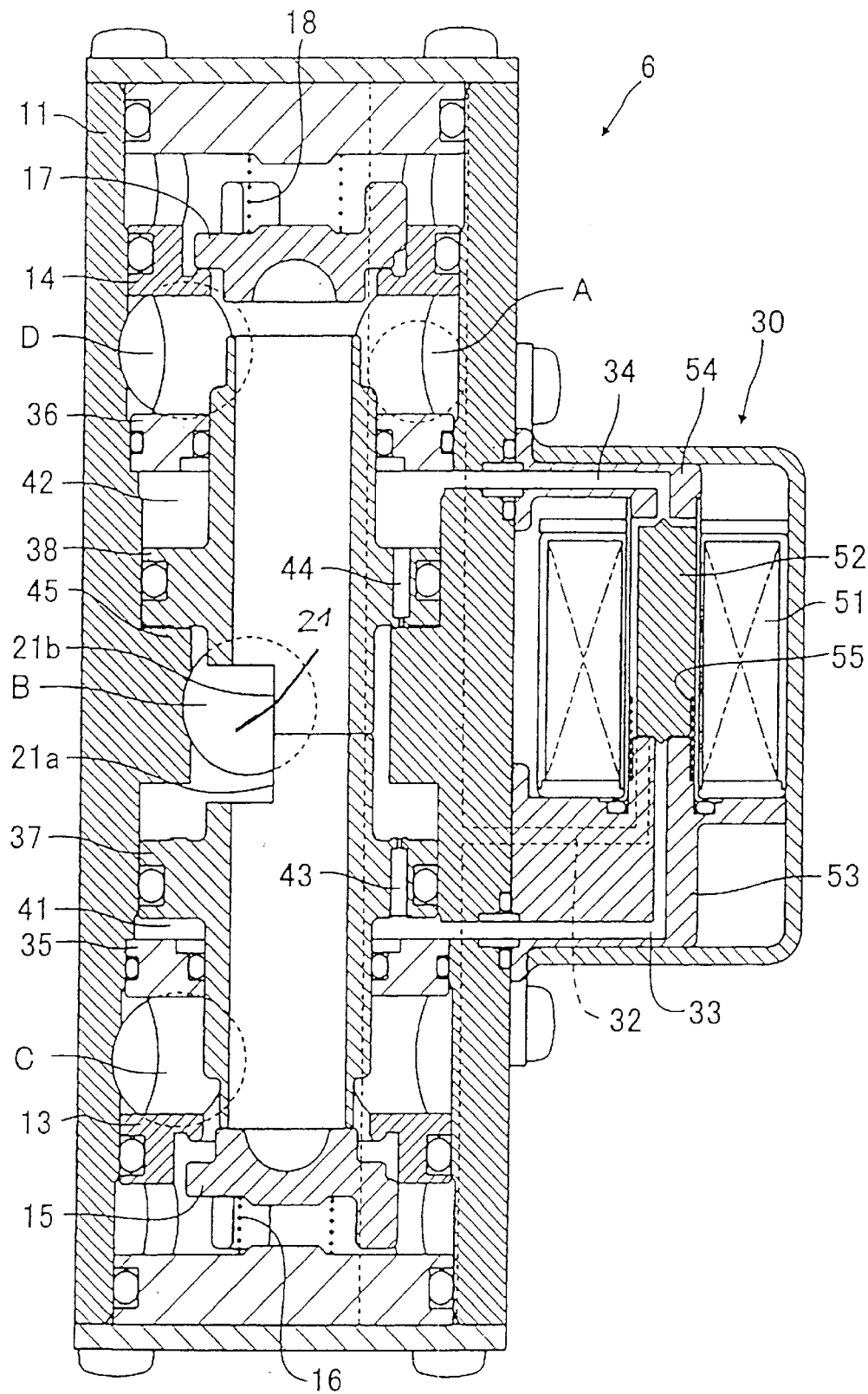
FIG. 8 is a longitudinal section in an "on" state of a solenoid.

In FIG. 7 a transitional state of valve switching immediately after switching the solenoid on is shown, while FIG. 8 shows the control valve 6 in the "on" state of the solenoid. Upon energisation of electromagnetic coil 51 moveable core 52 is magnetically attracted towards fixed core 53 and counter to the force of compression coil spring 55. Pilot hole 33 is closed, pilot hole 34 is open. High-pressure refrigerant gas from pipe A is brought through hole 32 into the cylindrical chamber of moveable core 52 and flows through a gap between the inner wall of said cylindrical chamber and said moveable core 52 into pilot hole 34 and further into second pressure-regulating chamber 42. At the same time, first pressure-regulating chamber 41 communicates via orifice 43 with low pressure isolated chamber 12 communicating with second pipe B such that the pressure within first pressure-regulating chamber 41 is reduced progressively. A differential pressure between both pressure-regulating chambers 41, 42 causes both valve elements 20a, 20b to move towards first valve closure element 15. Due to this motion second valve closure element 17 is moved against second valve seat 14 by second compression coil spring 18 and into its closed state. Thus, in the course of valve switching, as shown in FIG. 7, there is a state in which first and second valve closure elements 15, 17 are simultaneously in their closed states before completion of the switching operation.

When valve elements 20a, 20b are further moved towards first valve seat 13, valve closure element 15 is brought into its opening state against the force of compression coil spring 16.

Both valve elements 20a, 20b move further and stop (FIG. 8) as soon as separator wall 38 of valve element 20b abuts against stepped-up portion 45. Also then a minute part of the refrigerant gas may leak through orifice 44 out of second pressure-regulating chamber 42 during the motion of both valve elements 20a, 20b. However, the amount of leakage is reduced to a further minute quantity after separator wall 38 comes into abutment with stepped-up portion 45 so that orifice 44 is blocked.

Consequently, refrigerant gas from pipe A passes through first valve seat 13 into pipe C, while refrigerant gas from pipe D passes through the interior space of valve element 20b into pipe B. Thus, the switching operation is completed.

Figure 9:
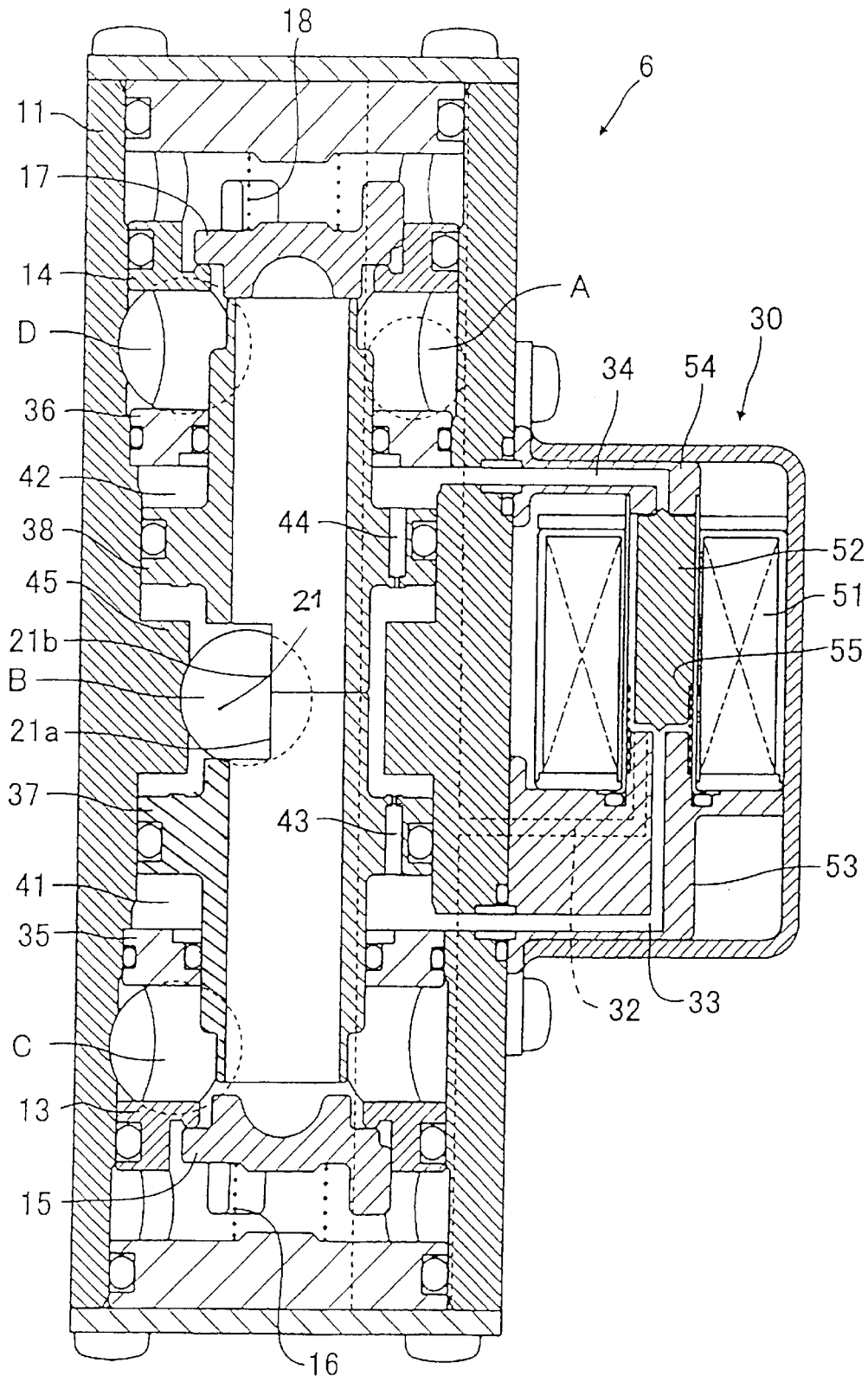
FIG. 9 is a longitudinal section showing a transitional state of valve switching immediately after the solenoid is switched off.

FIG. 9 shows a transitional state of valve switching control valve 6 immediately after the solenoid is switched off. Moveable core 52 is pressed against valve seat 54 by compression spring 55. Pilot hole 33 is opened, while pilot hole 34 is closed. High-pressure refrigerant gas from pipe A reaches the cylindrical chamber of said moveable core 52 via introducing hole 32 and flows into first pressure-regulating chamber 41 via pilot hole 33. At the same time, second pressure-regulating chamber 42 communicates via orifice 44 with low-pressure isolated chamber 12 communicating with second pipe B. The pressure within second pressure regulating chamber 42 is reduced progressively. A differential pressure between both pressure-regulating chambers 41, 42 causes both valve elements 20a, 20b to move towards second valve closure element 17.

Then valve 20b abuts against second valve closure element 17 and lifts the same against compression coil spring 18 until separator wall 37 of valve element 20a abuts stepped-up portion 45, representing the "off" state as shown in FIG. 6.

FIGS. 10 to 14 show a four-way directional control valve 6 according to a second embodiment of the invention.

Figure 10:
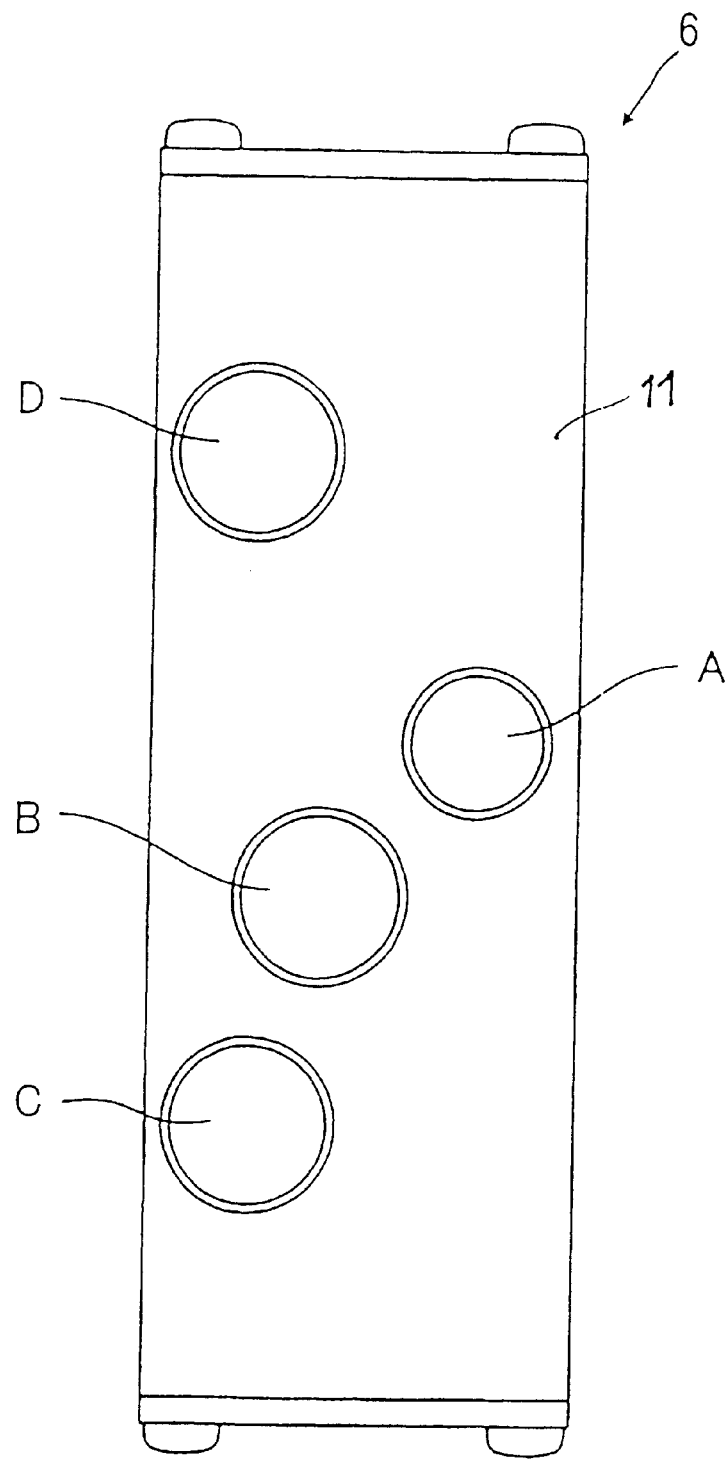
FIG. 10 is a front view of a four-way directional control valve according to a second embodiment of the invention.
Figure 11:
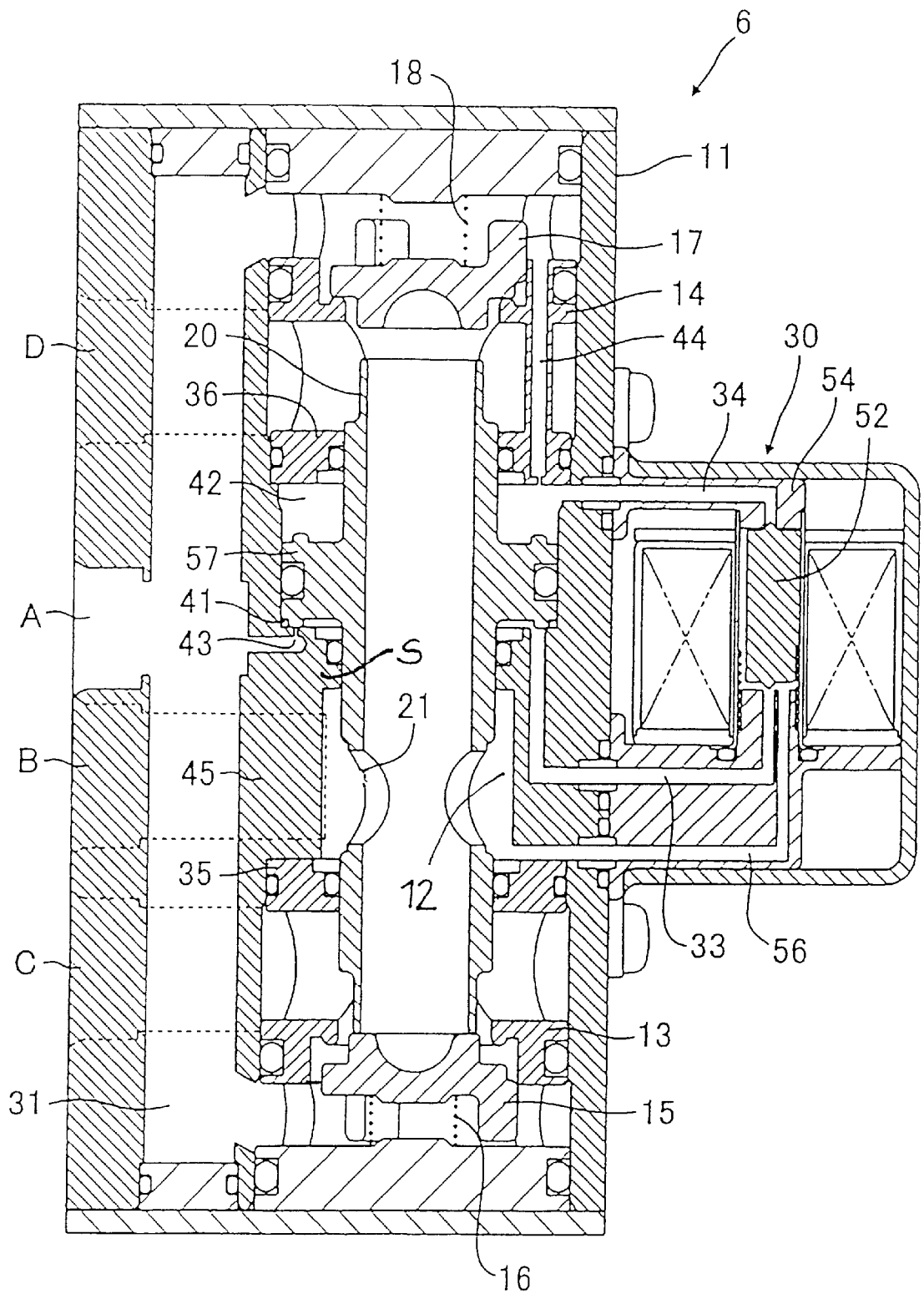
FIG. 11 is a longitudinal section of the valve of FIG. 10 in an "off" state of a solenoid.

In FIG. 10 (front view of the valve casing 11) the pipes A, B, C, D are connected to a front wall of the valve casing 11. A solenoid-operated pilot valve 30 is arranged on a side wall of said valve casing. FIG. 11 shows an "off" state of the solenoid. Differently from pilot valve 30 of the first embodiment used for changing the flow paths of high-pressure refrigerant gas, pilot valve 30 of the second embodiment is used to change between flow paths of low-pressure refrigerant gas. Pilot holes 33, 34 leading into first and second pressure-regulating chambers 41, 42, respectively, are opened and closed by moveable core 52. Distinguished from the former embodiment a low-pressure introducing hole 56 of pilot valve 30 communicates with the isolated low-pressure chamber 12 communicating with second pipe B so that refrigerant gas from the first or second pressure-regulating chamber 41, 42 can flow into second pipe B.

The valve mechanism of said four-way directional control valve 6 comprises compression coil spring 16, first valve closure element 15, first valve seat 13, first partition wall 35, a single hollow cylindrical valve element 20, second partition wall 36, second valve seat 14, second valve closure element 17, and compression coil spring 18. Furthermore, the casing bore receiving said valve mechanism component has an inwardly protruding shoulder defining an additional partition wall S in sealed co-action with the periphery of cylindrical hollow valve element 20.

Common high pressure passage 31 communicating with first pipe A leads to first and second valve closure elements 15 and 17, respectively. A connection portion or space defined between first valve seat 13 and first partition wall 35 communicates with pipe C, while a space or connection portion defined between second valve seat 14 and second partition wall 36 communicates with pipe D. Second valve seat 14 and second partition wall 36 are integrally formed with each other. An orifice 44 is formed through second vale seat 14 and second partition wall 36 for communication between common high pressure passage 31 and second pressure-regulating chamber 42. A stepped-up portion 45 of a wall defining the common high pressure passage 31 comprises an orifice 43 opening into first pressure regulating chamber 41. In a central portion of hollow cylindrical valve element 20 a cut-out hole 21 is formed which is open to the isolated low-pressure chamber 12 communicating with second pipe B.

Hollow cylindrical valve element 20 has a single flange portion or separator wall 57. Between both opposite sides of said separator wall 57 and the second partition wall 36 and the additional partition wall S said first and second pressure-regulating chambers 41, 42 are defined. Said separator wall 57 has annular ridge portions on its opposite surfaces at locations opposed to the mouths of said orifices 43, 44.

In the "off" state of the solenoid (electromagnetic coil 51 not energised) moveable core 52 closes pilot hole 34 due to the force of compression spring 55 and maintains pilot hole 33 open. Pilot hole 33 and low-pressure introducing hole 56 are communicating with each other. Since pilot hole 33 and low-pressure introducing hole 56 are sufficiently larger in cross-section then the cross-sectional area of orifice 43, pressure within first pressure-regulating chamber 41 is approximately equal (i.e. as low as) to the pressure within the isolated chamber 12 communicating with second pipe B. On the other hand, pilot hole 34 is closed by moveable core 52, and hence the pressure within second pressure-regulating chamber 42 becomes high via orifice 44 communicating with common high-pressure passage 31.

A differential pressure between both pressure-regulating chambers 41, 42 urges valve element 20 towards first valve closure element 15 to lift the same against the force of first compression coil spring 16 of first valve seat 13. Simultaneously second valve closure element 17 is pressed against second valve seat 14 by compression coil spring 18 and is held closed.

Refrigerant gas from first pipe A passes through common passage 31, first valve seat 13 into pipe C. Refrigerant gas from pipe D passes through the interior space of cylindrical valve element 20 and the cut-out hole 21 into pipe B.

Figure 12:
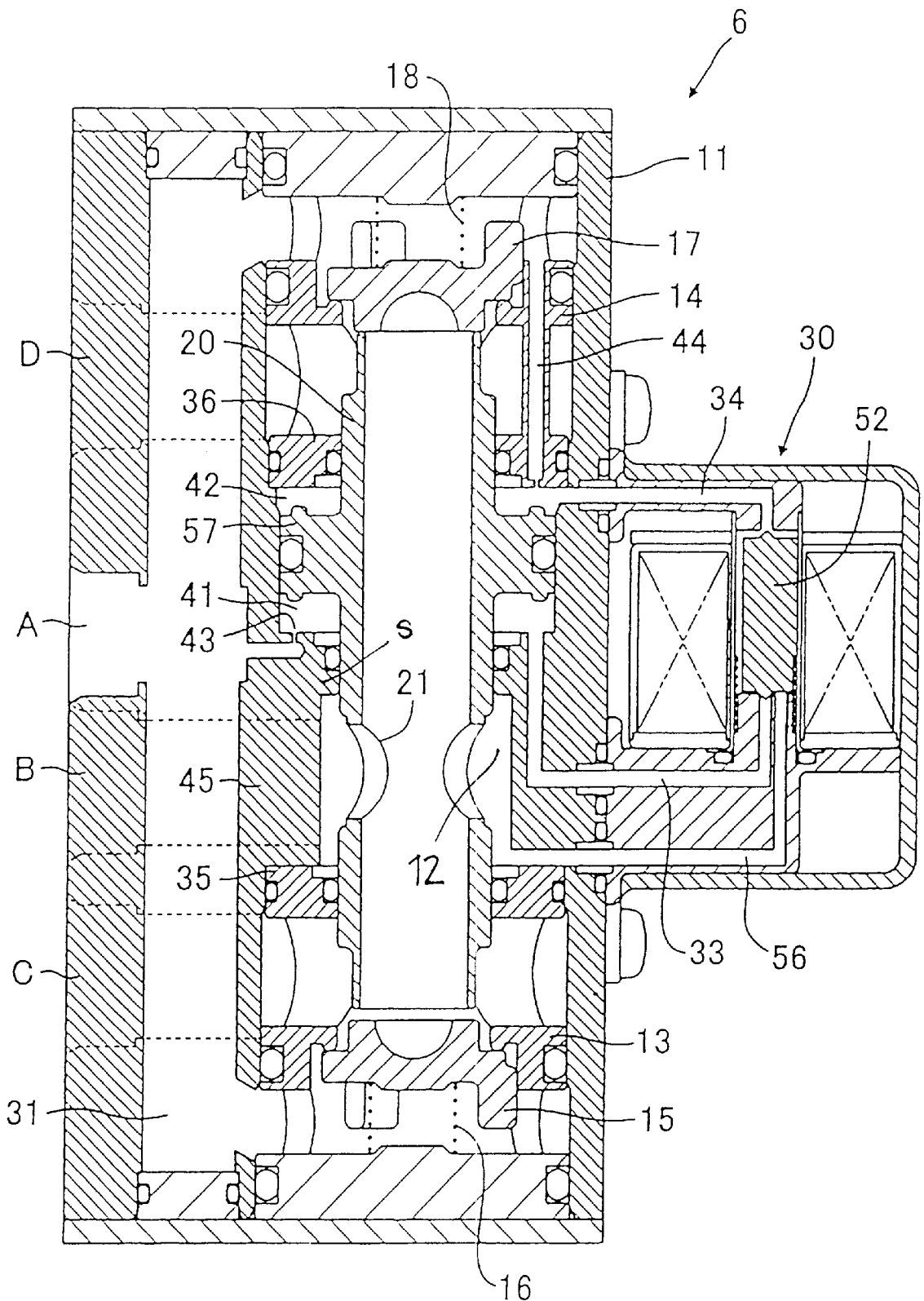
Figure 13:
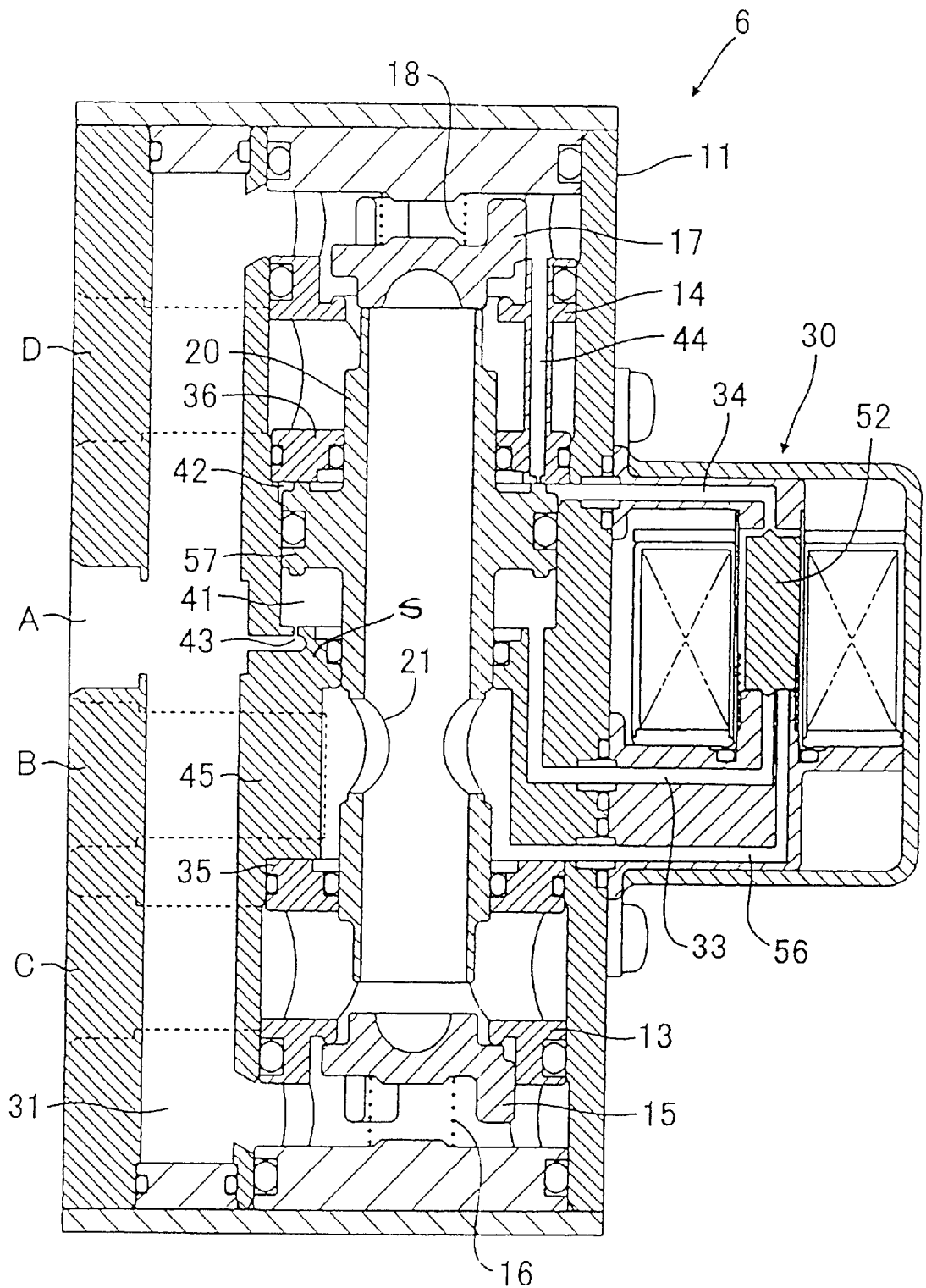
FIG. 13 is a longitudinal section of the control valve in an "on" state of the solenoid.

FIG. 12 shows a transitional state of valve switching immediately after the solenoid is switched on, while FIG. 13 shows the full "on" state.

Immediately after the solenoid is on by energisation of electromagnetic coil 51 moveable core 52 is magnetically attracted to fixed core 53 against compression coil spring 55 and closes pilot hole 33 while pilot hole 34 is open. High-pressure refrigerant gas within second pressure-regulating chamber 42 flows through pilot hole 34 and hole 56 into second pipe B, so that the pressure within second pressure-regulating chamber 42 is progressively reduced. At the same time pilot hole 33 is held closed by moveable core 52. High-pressure refrigerant gas from common high pressure passage 31 is introduced into first pressure-regulating chamber 41 via orifice 43. A differential pressure between both pressure-regulating chambers 41, 42 urges valve element 20 towards second valve closure element 17. Due to said motion of cylindrical valve element 20 also first valve closure element 15 is brought on first valve seat 13 by compression coil spring 16 and is eventually closed.

Valve element 20 then moves further and stops, as shown in FIG. 13, when separator wall 57 abuts against second partition wall 36. Second valve closure element 17 holds its open state, while first valve closure element 15 holds its closed state.

Refrigerant gas from first pipe A passes through second valve seat 14 into pipe D. Refrigerant gas from pipe C passes through the interior space of cylindrical valve element 20, cut-out hole 21, into pipe B. Thus, the switching operation is completed.

Figure 14:
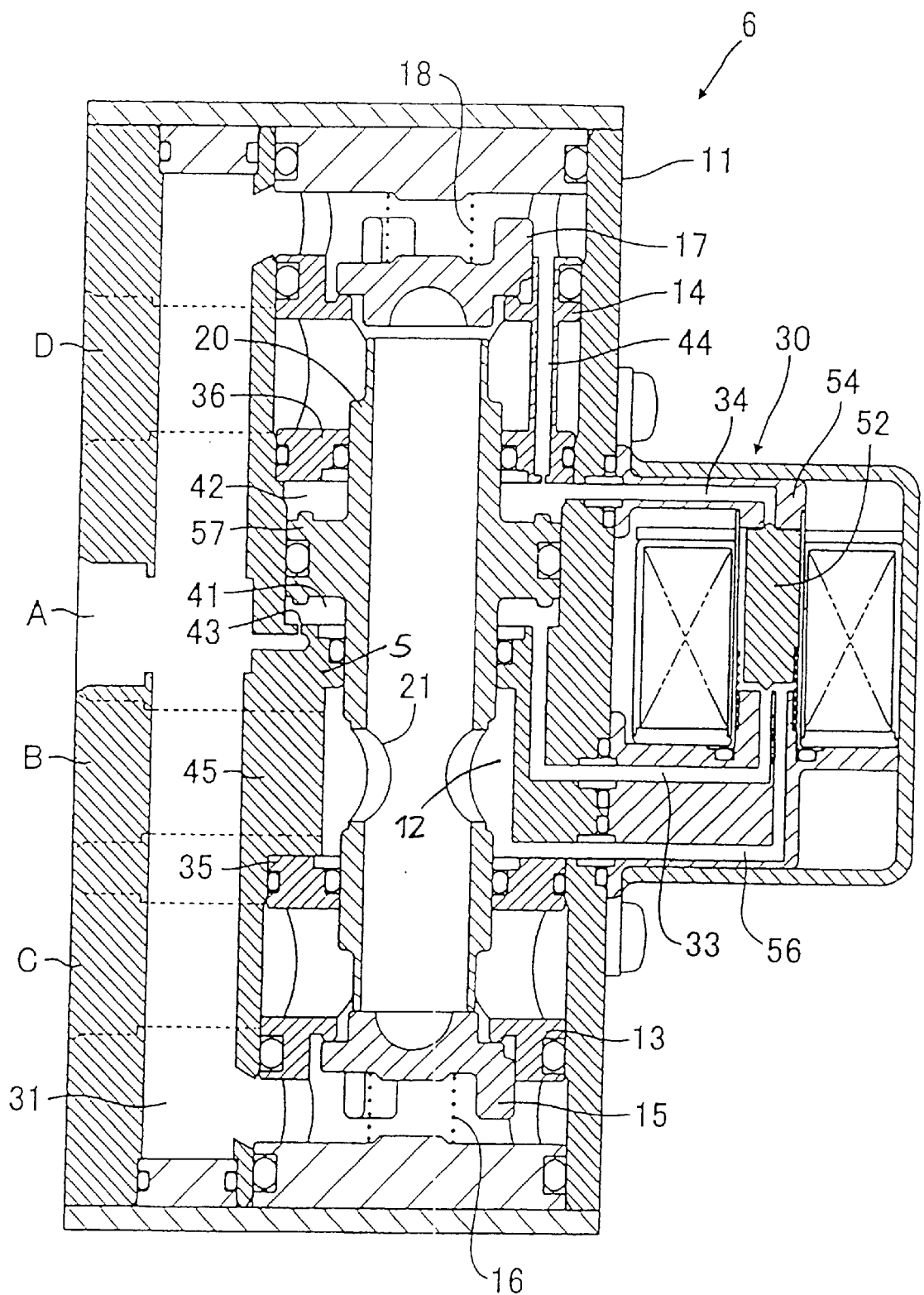
FIG. 14 is a longitudinal section of the control valve showing a transitional state of the valve switching immediately after the solenoid is switched off.

FIG. 14 shows a transitional state of valve switching immediately after solenoid is switched off. Moveable core 52 is pressed against valve seat 54 by compression coil spring 55. Pilot hole 33 is opened, pilot hole 34 is held in a closed state. The pressure within first pressure-regulating chamber 41 is progressively reduced via pilot hole 33 and introducing hole 56 to isolated low-pressure chamber 12 communicating with second pipe B. Since, on the other hand, moveable core 52 cuts off the existing flow path, high-pressure refrigerant gas from first pipe A flows into second pressure-regulating chamber 42. A differential pressure between both pressure-regulating chambers 41, 42 causes the valve element 20 to move towards the first valve closure element 15. Then valve element 20 lifts first valve closure element 15 against compression coil spring 16 until separator wall 57 abuts against stepped-up portion 45 or additional partition wall S. The four-way directional control valve 6 now is placed in the solenoid "off" state as shown in FIG. 11.

We claim:

1. A four-way directional control valve for switching between flow paths formed by four pipes, characterised by
   a valve casing defining therein a common high pressure passage in communication with a first pipe;
   an isolated low pressure chamber structurally isolated from said common high pressure passage and in communication with a second pipe;
   a first valve seat arranged within said valve casing at a location towards one axial end thereof and formed in a communication passage between a connecting portion of a third pipe and said common high pressure passage;
   a second valve seat arranged within said valve casing at a location towards the other axial end thereof and formed in a communication passage between a connecting portion of a fourth pipe and said common high pressure passage;
   a first valve closure element arranged at a location opposite to said first valve seat within said common high pressure passage and urged in a valve closing direction;
   a second valve closure element arranged at a location opposite to said second valve seat within said common high pressure passage and urged in a valve closing direction;
   a first hollow cylindrical valve element having one inner end open to said isolated low pressure chamber and having an outer separator wall serving as one separation wall for said isolated low pressure chamber, and another axially outer end within said connecting portion of said third pipe, said first hollow cylindrical valve element being axially moveable such that said axial outer end opens and closes said first valve closure element in relation to said first valve seat;
   a second hollow cylindrical valve element having one inner end open to said isolated low pressure chamber and having an outer separator wall serving as another separation wall for said isolated low pressure chamber, and another axial outer end within said connecting portion of said fourth pipe, said second hollow cylindrical valve element being axially moveable such that said another axial outer end opens and closes said second valve closure element in relation to said second valve seat;
   a first pressure-regulating chamber defined between said separator wall and a first partition wall separating said connecting portion of said third pipe from said first pressure-regulating chamber, said first pressure-regulating chamber communicating with said isolated chamber via an orifice through said separator wall;
   a second pressure-regulating chamber defined between said separator wall and a second partition wall separating said connecting portion of said fourth pipe from said second pressure-regulating chamber, said second pressure-regulating chamber communicating with said isolated chamber via an orifice through said separator wall; and
   a pilot valve for introducing high pressure fluid pressure from said common high pressure passage into said first or second pressure-regulating chambers in a switchable manner to thereby axially move said first and second hollow cylindrical valve elements.

2. A four-way directional control valve as in claim 1, wherein said pilot valve is a solenoid-driven two-way directional control valve for switching alternating between flow paths branched from said common high pressure passage to said first or second pressure-regulating chambers.

3. A four-way directional control valve for switching between flow paths formed by four pipes, characterised by
   a valve casing defining therein a common high pressure passage in communication with a first pipe;
   an isolated low pressure chamber structurally isolated from said common high pressure passage and in communication with a second pipe;
   a first valve seat arranged within said valve casing at a location towards one axial end thereof and formed in a communication passage between a connecting portion of a third pipe and said common high pressure passage;
   a second valve seat arranged within said valve casing at a location towards another axial end thereof and formed in a communication passage between a connecting portion of a fourth pipe and said common high pressure passage;
   a first valve closure element arranged at a location opposite to said first valve seat within said common high pressure passage and urged in a valve closing direction;
   a second valve closure element arranged at a location opposite to said second valve seat within said common high pressure passage and urged in a valve closing direction;
   one hollow cylindrical valve element having a central portion open to said isolated low pressure chamber, one axial outer end within said connecting portion of said third pipe and another axial outer end within said connecting portion of said fourth pipe, said hollow cylindrical valve element being axially moveable such that said one axial outer end opens and closes said first valve closure element and said another axial outer end opens and closes said second valve element, in relation to said first and said second valve seat, respectively, said hollow cylindrical valve element having an exterior flange portion defining a separator wall at an intermediate portion thereof;
   a first pressure-regulating chamber defined between said flange portion and a partition wall separating said connecting portion of said third pipe from said first pressure-regulating chamber, said first pressure-regulating chamber communicating with said common high pressure passage via an orifice formed though said partition wall; a second pressure-regulating chamber defined between said flange portion and a separation wall of said isolated low pressure chamber, said second pressure-regulating chamber communicating with said common high-pressure passage via an orifice formed through said separation wall, a pilot valve for introducing alternately respective fluid pressures of said first and said second pressure-regulating chambers into said isolated low pressure chamber in a switchable manner to thereby axially move said hollow cylindrical valve element.

4. A four-way directional control valve as in claim 3, wherein said pilot valve is a solenoid driven two-way directional control valve for switching between a connection path to said isolated low pressure chamber and respective flow paths communicating with said first and said second pressure-regulating chambers.

5. A four-way directional control valve for switching between flow paths formed by four pipes, comprising a valve casing, a common high pressure passage communicating with a first pipe, and respective connecting portions of a third and a fourth pipe, and an isolated low pressure chamber structurally isolated from said common high pressure passage and communicating with a second pipe, first and second valve seats coaxially to a common valve axis, each communicating with one of said connecting portions, first and second movably arranged valve closure elements within said common high pressure passage associated to said first and second valve seats, each being urged in closing direction against its valve seat, said first and second valve seats with associated to first and second partition walls defining said connecting portions of said third and fourth pipes, first and second hollow cylindrical valve elements coaxially with said common valve axis and abutting on each other with their inner ends which simultaneously communicate with said isolated low pressure chamber, both valve elements being axially shiftable within a casing bore such that their axial outer ends are engageable alternately in opening direction at said first and second valve closure elements, each cylindrical valve element having an outer separator wall located within one of a first and a second pressure-regulating chamber the pressures of which are variable between the pressure in said common high pressure passage and the pressure within said isolated low pressure chamber by means of a pilot valve switchable between two switching positions, wherein said separator walls of said first and second cylindrical hollow valve elements confine said isolated low pressure chamber within said casing bore, and wherein both partition walls of said connecting portions of the third and fourth pipes confine said first and second pressure-regulating chambers within said casing bore.

6. A four-way directional control valve as in claim 5, wherein said partition walls and said first and second valve seats are annular bodies positioned by press fitting within said casing bore, said casing bore being stepped with positioning shoulders the diameters of which decrease in a direction towards said isolated low pressure chamber.

7. A four-way directional control valve for switching between flow paths formed by four pipes, comprising a valve casing, a common high pressure passage communicating with a first pipe, and respective connecting portions of a third and fourth pipe, and an isolated low pressure chamber structurally isolated from said common high pressure passage and communicating with a second pipe, first and second valve seats coaxially to a common valve axis, each communicating with one of said connecting portions, first and second movably arranged valve closure elements within said common high pressure passage associated to said first and second valve seats and each being urged in closing direction against its valve seat, said first and second valve seats with associated to first and second partition walls defining said connection portions of said third and fourth pipes, first and second cylindrical hollow valve element actuation ends coaxially with said common valve axis and movable for alternating co-action with said first and said second valve closure elements, said first and second actuation ends communicating with said isolated low pressure chamber, at least one separator wall structurally united with at least one of said first and second actuation ends and defining a pressure sensitive drive means for axially displacing said first and second actuation ends motion within a casing bore extending between said first and second valve seats, and first and second pressure regulating chambers structurally separated from said common high pressure passage within said casing bore, the pressures in which alternating are variable between the pressure in said common high pressure passage and the pressure within said isolated low pressure chamber by means of a pilot valve, wherein said first and second cylindrical hollow actuation ends are provided at a single unitary cylindrical hollow valve element, said cylindrical and hollow valve element having only one separator wall, with opposite actuation surfaces located within said first and second pressure-regulating chambers, said first pressure-regulating chamber being confined by the partition wall of one of said connecting portions, the second pressure-regulating chamber being confined by a further additional partition wall of said casing bore, said partition wall of said other connecting portion and said additional partition wall commonly confining said isolated low pressure chamber.

8. A four-way directional control valve as in claim 7, wherein said additional partition wall is defined by an annular inner shoulder of said casing bore.

9. A four-way directional control valve as in claim 5, wherein said first and second separator walls and said single separator wall are unitarily formed with the respective cylindrical hollow valve element.

10. A four-way directional control valve as in claim 5, wherein said pilot valve comprises an axially moveable core forming by its both ends valve closure elements of said flow paths leading into said first and second pressure-regulating chambers, said core (being urged by a compression spring in closing direction of one of said flow paths, said moveable core being moveable counter to the urging force of said compression spring by a magnetic coil, said flow path into said isolated low pressure chamber extending within a core receiving chamber along the outer periphery of said moveable core.

11. A four-way directional control valve as in claim 7, wherein said pilot valve is solenoid actuated and comprises an axially moveable core forming valve closure elements by both axial ends for said flow paths into said first and second pressure-regulating chambers, said moveable core being urged by a compression spring to block off one of said flow paths, and being moveable counter to the urging force of said compression spring by a magnetic coil, and wherein said further flow path into said isolated low pressure chamber extends along the outer periphery of said moveable core.

* * * * *